Feb. 3, 1925.  
C. W. H. DOUBLER  
1,525,183  
RESISTANCE UNIT AND METHOD OF MAKING THE SAME  
Filed Nov. 19, 1921

INVENTOR.  
Charles W. H. Doubler  
BY Morsell and Keeney  
ATTORNEYS.

Patented Feb. 3, 1925.

1,525,183

UNITED STATES PATENT OFFICE.

CHARLES W. H'DOUBLER, OF RACINE, WISCONSIN.

RESISTANCE UNIT AND METHOD OF MAKING THE SAME.

Application filed November 19, 1921. Serial No. 516,424.

*To all whom it may concern:*

Be it known that I, CHARLES W. H'DOUB-LER, a citizen of the United States, and resident of Racine, in the county of Racine and State of Wisconsin, have invented new and useful Improvements in Resistance Units and Methods of Making the Same, of which the following is a description, reference being had to the accompanying drawings, which are a part of this specification.

This invention relates to improvements in resistance units and method of making the same, the units being particularly adapted for use in connection with rheostats, lightning arrestors or small devices requiring but moderate heat, and the like.

One of the objects of the invention is to provide a unit which will be practically indestructible, economical to manufacture, and which will offer maximum resistance to the passage of electric currents without the generation of an excessive amount of heat.

A further object of the invention is to provide a unit consisting of a quantity of finely comminuted electrical conducting material, for example, carbon, and a quantity of finely comminuted non-electrical conducting cementitious material, for example, Portland cement, the two materials being thoroughly intermixed, sufficient of a moistening agent, for example, water, being added to form a plastic and eventually a solidified mass, sufficient of the carbonaceous material being used to form a unit having the desired resistance to the passage of electric currents.

A further object of the invention is to provide a plurality of contact members on the unit so that the electric conductors may be connected thereto in various arrangements, using much or little of the resistance element as may be desired, the contact members preferably being partially embedded in the unit while it is in a plastic state.

Portland cement contains a considerable quantity of excess lime which is liberated as a free calcium hydrate when water is added. I have found it desirable to dilute the cement with a "filler," preferably a substantially equal quantity of pulverized silica being used. The silica combines with the free calcium hydrate during hydration thus forming an extra amount of calcium silicate in the resulting concrete mass which adds greatly to the durability of the finished product and also provides a unit which develops less heat than is the case when silica is not used.

After the units are cast in the mold, they are cured by being placed in the presence of a moistening agent for a period of time and after being cured, they are thoroughly dried and are ready for use. If the units are to be used in damp places, they are preferably coated with a water-proofing material, for example, enamel.

The invention consists in the novel constructions and arrangements to be hereinafter described and claimed for carrying out the above stated objects, as will appear from the following specification, and it consists further in the improved method of making the units to be hereinafter described and claimed.

The invention is illustrated in certain preferred embodiments in the accompanying drawings, wherein—

Like characters of reference designate like parts in the several views.

Figure 1:
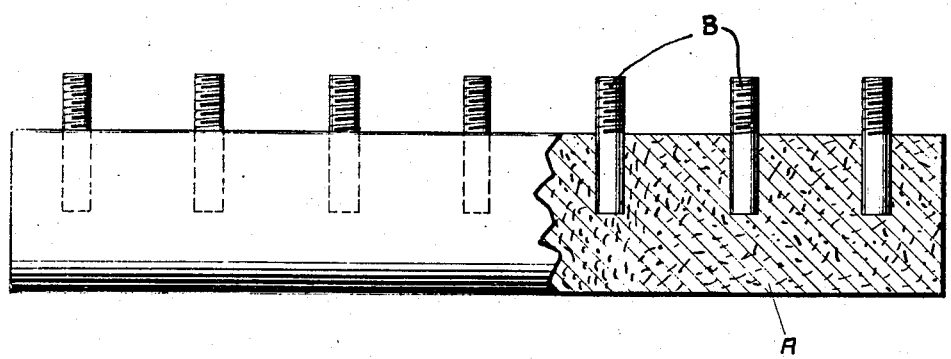
Fig. 1 is a view partially in section and partially in side elevation of a resistance unit embodying the principles of the invention.

Referring now to the drawings, the body A of the resistance unit comprises a quantity of cementitious material, preferably Portland cement, which is mixed with a substantially equal amount of a "filler" material preferably finely pulverized silica, and a quantity of finely pulverized electrical conducting material, for example, carbon. The amount of cement and silica used in relation to the amount of carbonaceous material may be considerably varied, for example, one-tenth, one-fifth, one-half, or any part of an amount of carbonaceous material equal to the cement or silica may be used, in order to give the unit the desired resistance to the passage of electric currents. The compound is preferably reground very finely to thoroughly intermix the various ingredients and to this compound is added sufficient of a moistening agent, for example, water to form a plastic mass of the consistency of stiff dough. The plastic mass is then cast in molds of the desired size and shape, the material being subjected to considerable pressure in order to insure intimate contact of the particles and also to insure low permeability so as to exclude as much moisture as possible from the finished product.

The cement contains a considerable quantity of excess lime which is liberated as a free calcium hydrate when water is added. The silica combines with the free calcium hydrate during hydration thus forming an extra amount of calcium silicate in the resulting concrete which adds greatly to the durability of the unit and also provides a unit which in service develops considerably less heat than would be the case if a "filler" such as silica were not employed.

When the units are removed from the molds, they are cured by placing them in the presence of a moistening agent. I preferably carry out this step by placing the units in a damp air chamber for twelve to twenty-four hours after which they are placed in a steam cylinder for ten to twelve hours in the presence of live steam at a pressure of approximately one hundred and twenty-five pounds per square inch. Instead of placing them in the steam cylinder they may be immersed in water for a period of several days and cured. Curing by the use of steam is preferable, however, because it produces superior units and in less time. After being thoroughly dried to eliminate all moisture, the units are ready for use, but if they are to be exposed to much dampness, they are preferably coated by a waterproofing material such as enamel or a glazed vitreous material, for example, porcelain.

Figure 2:
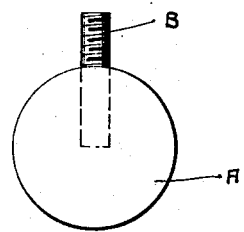
Fig. 2 is an end elevational view of the unit.
Figure 3:
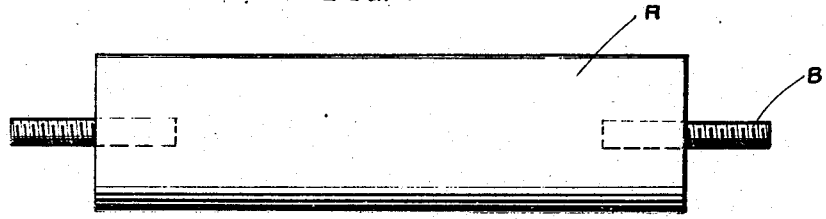
Fig. 3 is a unit of slightly modified construction.

A plurality of metallic contact members B are preferably provided on the unit so that the electric conductors may be connected thereto in various arrangements, using as much or as little of the resistance element as may be desired. The contact members may be, although not necessarily, in the form of studs placed in cavities provided in the molds so as to become embedded in the units at the time of molding, as shown in the drawing. In Figs. 1 and 2, the studs are shown as projecting from one side of the unit while in Fig. 3 they are shown as projecting from the opposite end of the units.

Figure 4:
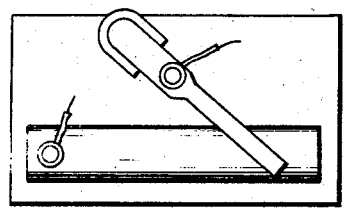
Fig. 4 is a plan view of a modification.

It is also to be understood that while the metal contacts embedded are in most cases desirable, as arcing is thereby kept at the minimum, they may be omitted, if desired, and contact made through one fixed metal stud designated in the modified structure, shown in Fig. 4, by the letter C, and a member movable back and forth on or in contact with the surface, thus giving every possible gradation of resistance between the two ends of the resistance unit, but in this event water-proofing is not admissible.

A resistance unit constructed according to my invention is practically indestructible and offers maximum resistance to the passage of electric currents without generation of an excessive amount of heat. As the ingredients which enter into the composition are easy to obtain and low in price and since no difficult steps are involved in making the units, it is obvious that they may be manufactured very economically.

I claim:

1. A resistance unit comprising a quantity of comminuted silica, a substantially equal quantity of Portland cement, and sufficient of a carbonaceous material to give the mass the desired resistance to the passage of electric currents, said materials being intermixed and sufficient of a moistening agent being added to form a solidified mass.

2. A resistance unit comprising a quantity of comminuted silica, a substantially equal quantity of Portland cement, and sufficient of a carbonaceous material to give the mass the desired resistance to the passage of electrical currents, said materials being intermixed, sufficient of a moistening agent being added to form a solidified body, and a coating of waterproofing material surrounding said body.

3. A resistance unit comprising a quantity of carbonaceous material, a quantity of cementitious material, said materials being intermixed, sufficient of a moistening agent being added to form a solidified body, and a plurality of contact members partially embedded in said body.

4. A resistance unit comprising a quantity of comminuted silica, a substantially equal quantity of Portland cement, and sufficient of a carbonaceous material to give the mass the desired resistance to the passage of electrical currents, said material being intermixed, sufficient of a moistening agent being added to form a solidified body, and a plurality of contact members partially embedded in said body.

5. A resistance unit comprising a quantity of carbonaceous material, a quantity of cementitious material, said materials being intermixed, sufficient of a moistening agent being added to form a solidified body, a plurality of contact members partially embedded in said body, and a coating of waterproofing material surrounding said body.

6. A resistance unit comprising a quantity of comminuted silica, a substantially equal quantity of Portland cement, and sufficient of a carbonaceous material to give the mass the desired resistance to the passage of electrical currents, said materials being intermixed, sufficient of a moistening agent being added to form a solidified body, a plurality of contact members partially embedded in said body, and a coating of waterproofing material surrounding said body.

7. Method of making a resistance unit which consists in mixing a quantity of comminuted silica, a substantially equal quantity of Portland cement, and sufficient of a carbonaceous material to give the mass the desired resistance to the passage of electric currents, adding sufficient of a moistening agent to form a plastic mass, casting the mass in a mold to form the unit, curing the molded unit in the presence of a moistening agent, drying the unit, and then applying a coat of water-proofing substance thereto.

In testimony whereof, I affix my signature.

CHARLES W. H'DOUBLER.